United States Patent [19]

Takeda et al.

[11] Patent Number: 5,016,125
[45] Date of Patent: May 14, 1991

[54] TAPE LOADING MECHANISM FOR A MAGNETIC RECORDING/REPRODUCING APPARATUS

[75] Inventors: Hidekazu Takeda, Katsuta; Kenji Ogiro; Nobuyuki Kaku, both of Yokohama; Kyuichirou Nagai, Fujisawa, all of Japan

[73] Assignee: Hitachi, Ltd., Tokyo, Japan

[21] Appl. No.: 322,971

[22] Filed: Mar. 14, 1989

[30] Foreign Application Priority Data

Mar. 17, 1988 [JP] Japan .................................. 63-61972
Apr. 15, 1988 [JP] Japan .................................. 63-91808

[51] Int. Cl.$^5$ .......................................... G11B 15/665
[52] U.S. Cl. ...................................................... 360/85
[58] Field of Search ........................................... 360/85

[56] References Cited

U.S. PATENT DOCUMENTS 4,445,154  4/1984  Kihara et al. ........................ 360/85

Primary Examiner—Robert S. Tupper
Attorney, Agent, or Firm—Antonelli, Terry, Stout & Kraus

[57] ABSTRACT

A helical scanning type of magnetic recording/reproducing apparatus in which a first entrance-side tape height regulation guide is disposed in a level higher than a center of a plane of rotation of magnetic heads mounted on a rotary drum assembly when the magnetic tape is loaded on the rotary drum assembly, and a first exit-side tape height regulation guide is disposed in a level lower than the center of the plane of rotation of the magnetic heads. The rotary drum assembly is disposed in a higher position such that its upper end is in the same level as an upper end of a lid of a tape cassette. The cassette is disposed at a lever lower than that of the first exit-side tape height regulation guide. The first entrance-side and the first exit-side tape height regulation guides are driven by a loading ring inclined towards the cassette so as to move while engaging with the magnetic tape during loading or unloading. A capstan motor is accommodated in a space formed between the inclined loading ring and a main chassis. This construction enables reductions in the overall thickness and the weight of the apparatus.

13 Claims, 6 Drawing Sheets

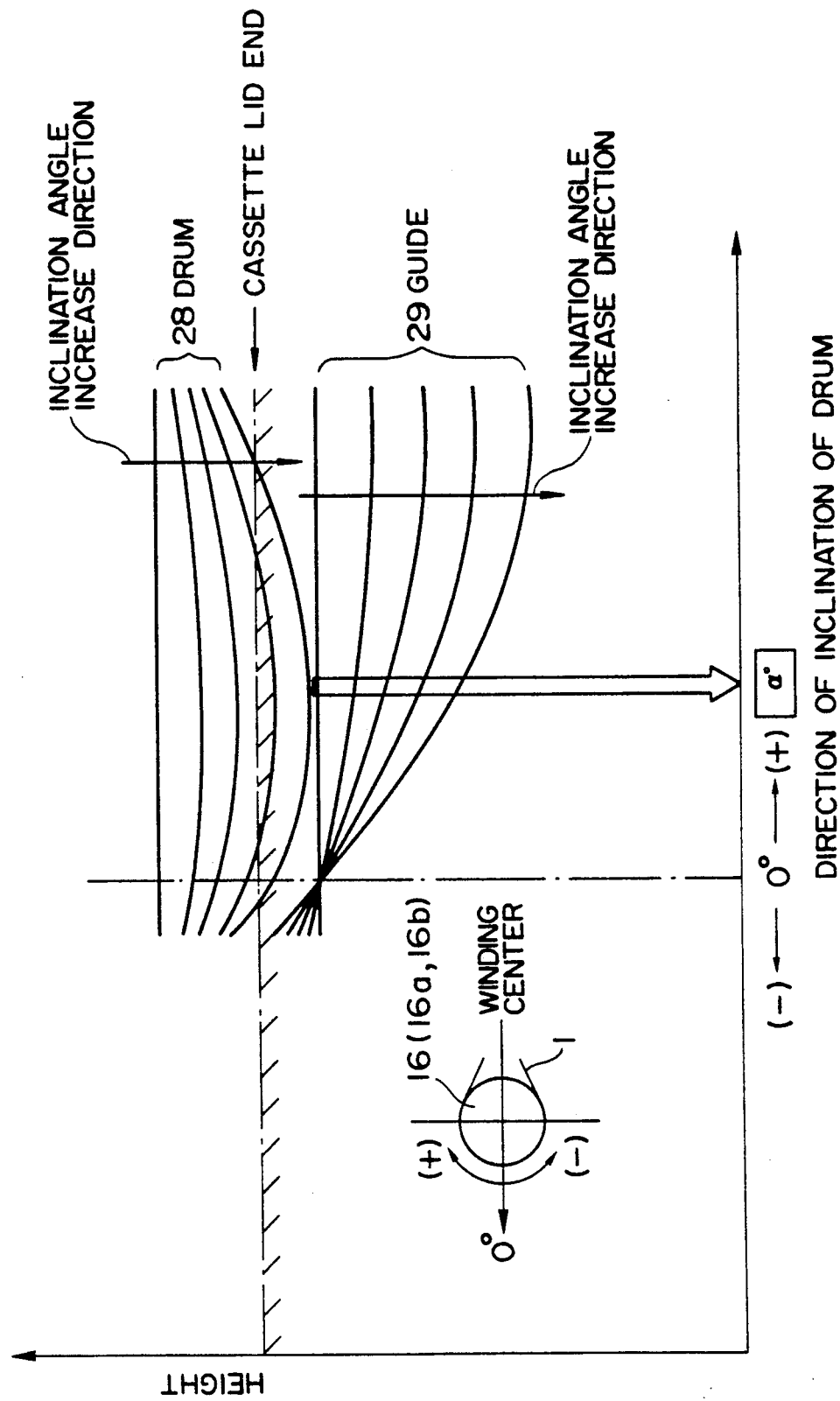

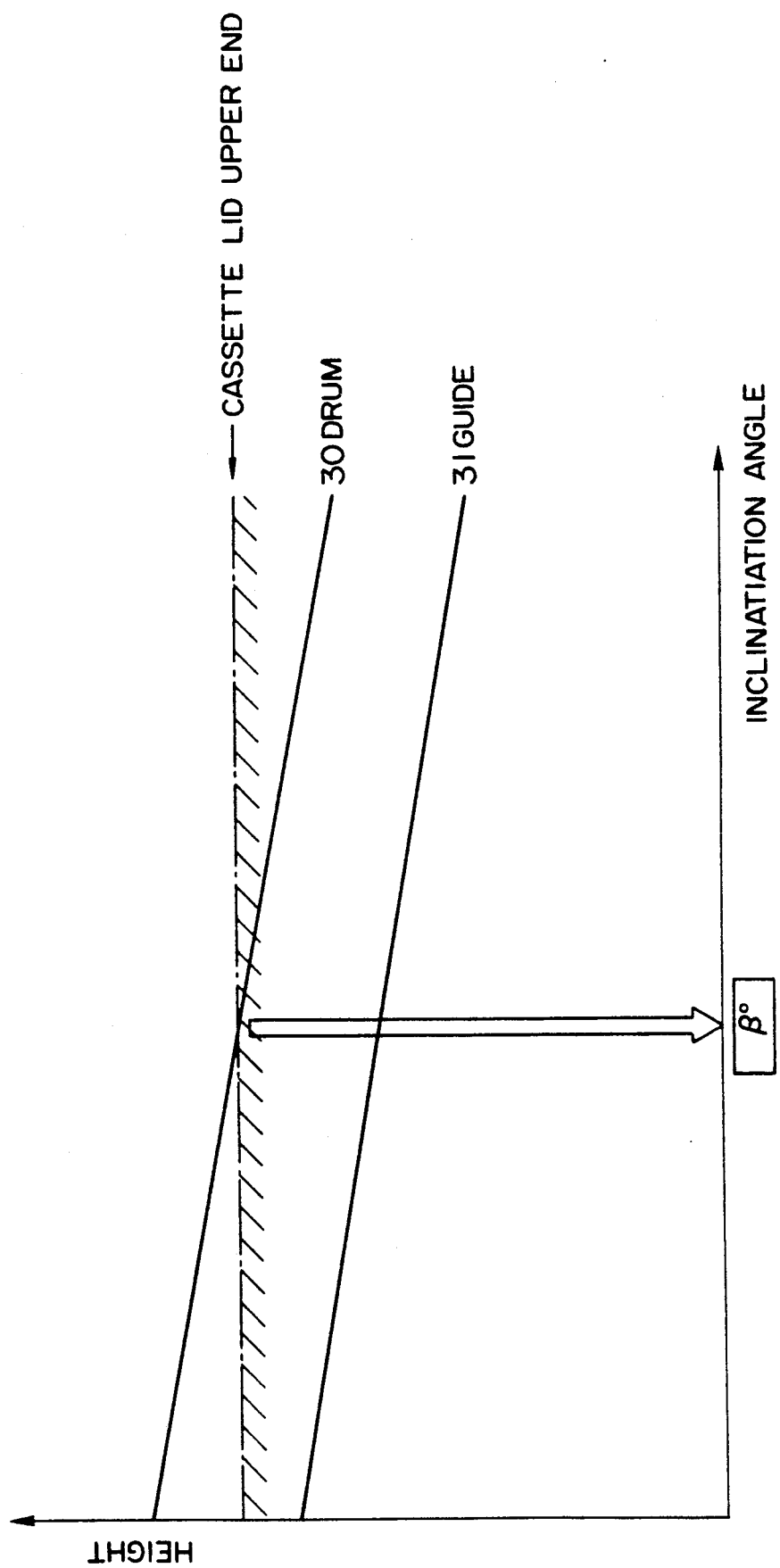

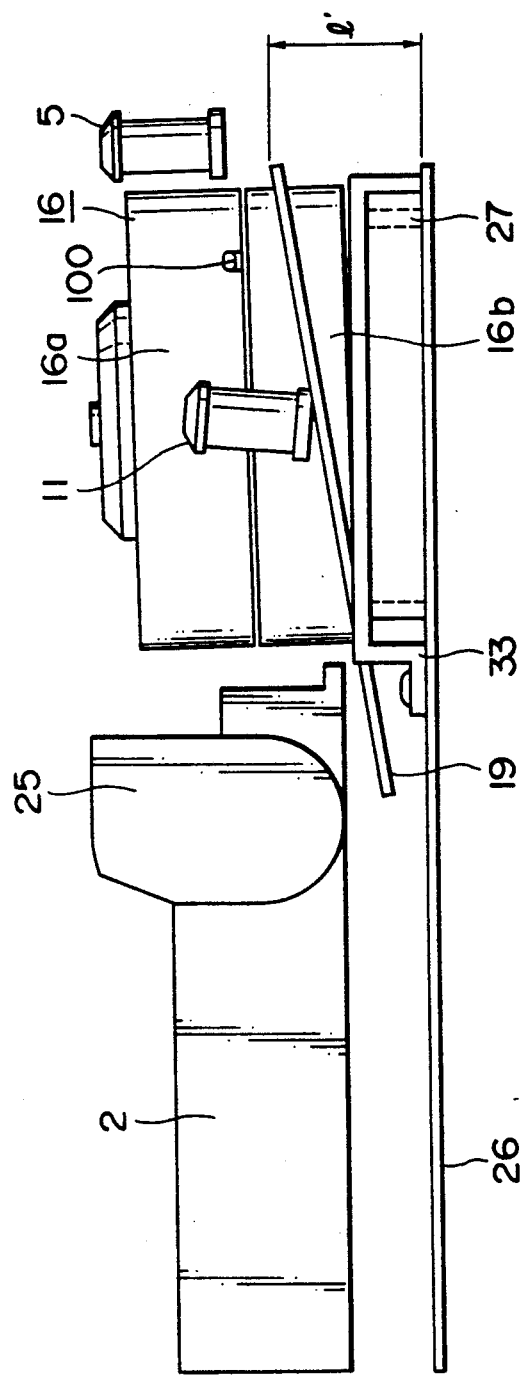

TAPE LOADING MECHANISM FOR A MAGNETIC RECORDING/REPRODUCING APPARATUS

BACKGROUND OF THE INVENTION

This invention relates to a helical scanning type of magnetic recording/reproducing apparatus having a mechanism for running a magnetic tape.

Conventionally, a following mechanism for running a magnetic tape is provided in a recording/reproducing apparatus such as a video tape recorder (hereinafter referred to as "VTR"), which performs helical scanning over a surface of a magnetic tape with rotary magnetic heads and records and reproduces signals thereon. The mechanism is constructed on a main chassis or a base for supporting the appratus. This mechanism has the following components disposed over the main chassis: magnetic heads; a cylindrical rotary drum which has magnetic heads mounted in an outer periphery thereof and which has an axis of rotation inclined relative to a horizontal major surface of the main chassis at an angle equal to the lead angle (the inclination of the plane of rotation of the magnetic heads relative to a direction in which a magnetic tape travels); a stationary drum which is disposed below the rotary drum coaxially therewith and has a lead portion formed on an outer periphery thereof for guiding the magnetic tape; means for driving and rotating the rotary drum; a cassette which accommodates the magnetic tape wound around reels; and an entrance-side tape position regulation guide which draws the magnetic tape out of the cassette to obliquely wind it around the outer peripheries of the rotary and the stationary drums. This entrance-side tape position regulation guide keeps the position of the magnetic tape higher than the center of the plane of rotation of the magnetic heads in a section where the magnetic tape starts to wind upon the drums (tape entrance section), thus controlling the position of the magnetic tape under the tape wound condition. The mechanism further has the following components disposed over the main chassis: an exit-side tape position regulation guide for keeping the position of the magnetic tape lower than the center of the plane of rotation of the magnetic heads in a section where the magnetic tape starts to unwind from the drums (tape exit section) and at the same level as a reference plane (hereinafter referred to as "central reference plane") corresponding to the widthwise center of the magnetic tape in the cassette in order that the recording surface of the magnetic tape is perpendicular to the central reference plane and, at the same time, the tape travel direction is parallel to the central reference plane; and a loading ring to which the entrance-side tape position regulation guide and the exit-side tape position regulation guide are connected, and which ring has an annular structure encircling the rotary and the stationary drums, and which ring is disposed parallel to the major surface of the main chassis. Under the main chassis are disposed a capstan motor for running the magnetic tape and a flywheel for increasing the inertia of the capstan motor, both of which are so disposed as to avoid interfering with the loading ring.

An example of this conventional arrangement is disclosed in JP-A-57-86161.

The above-described conventional art entails the following problems.

1) The loading ring is disposed parallel to the major surface of the main chassis. The magnetic tape is so retained and controlled relative to the rotary and stationary drums by the exit-side tape position regulation guide that the magnetic tape is maintained at the tape exit section at the same level as the central reference plane and in perpendicular to the central reference plane and the tape travel direction is parallel thereto. Accordingly, the direction and the angle of inclination of the rotary and the stationary drums must be limited within certain ranges to maintain desired magnetic tape running performance. It is also necessary to place the center of the plane of rotation of the magnetic heads substantially higher than the central reference plane. Accordingly, the magnetic tape starts to wind the rotary and the stationary drums at a higher position in the tape entrance section. Correspondingly, the entrance-side tape position regulation guide occupies a higher position in that section, so that a top end of the entrance-side tape position regulation guide projects upwards far beyond an upper end of the rotary drum. The top end of the rotary drum is placed much higher than the central reference plane to a large extent and also higher than an upper end of a cassette front lid which defines the upper end of the cassette. In consequence, the distance in the vertical direction between the central reference plane and the top end of the entrance-side tape position regulation guide is so large that the overall thickness of the mechanism is considerably increased.

2) The capstan motor and the flywheel both attached to a reverse side of the main chassis are the thickest ones of the component parts disposed under the main chassis, and the lower ends of the capstan and the flywheel project downward to largest extends. Therefore, the thickness of the section below the main chassis is considerably increased. An electronic circuit board is also disposed on the reverse side of the main chassis. It is necessary to form cutout portions in this circuit board for providing spaces for attachment of the capstan motor and the flywheel. Therefore the configuration of the electronic circuit board becomes complicated, and the area required for wiring is restricted. In addition since the capstan motor and the flywheel are disposed under the main chassis, the assembly of these components into the main chassis is difficult.

SUMMARY OF THE INVENTION

In view of these problems, it is an object of the present invention to provide a helical scanning type of magnetic recording/reproducing apparatus having a magnetic tape running mechanism reduced in thickness and weight, constituted by a smaller number of component parts and improved in the facility of assembly.

To this end, the present invention provides magnetic recording/reproducing apparatus basically having: magnetic heads for recording and reproducing signals on or from a magnetic tape; a rotary drum having the magnetic heads fixed to an outer periphery thereof; a stationary drum disposed coaxially with the rotary drum; a cassette which accommodates the magnetic tape therein and which is so disposed that a central reference plane corresponding to a widthwise center of the magnetic tape in the cassette is placed lower than a center of a plane of rotation of the magnetic heads; a first entrance-side tape position regulation guide which draws the magnetic tape out of the cassette to obliquely wind it around the outer peripheries of the rotary and the stationary drums, and which keeps the position of the magnetic tape higher than the center of the plane of rotation of the magnetic heads in a tape winding section where the magnetic tape starts to wind upon the drums; a first exit-side tape position regulation guide which keeps the position of the magnetic tape lower than the center of the plane of rotation of the magnetic heads and higher than the central reference plane in a tape unwinding section where the magnetic tape starts to unwind from the drums; and tape loading means including the first entrance-side tape position regulation guide and the first exit-side tape position regulation guide, the tape loading means being disposed encircling the rotary and the stationary drums, the tape loading means operating to load the magnetic tape around the outer peripheries of the rotary and the stationary drums or unload the magnetic tape from these drums when rotated at a predetermined angle or moved to a predetermined extent.

It is preferable that the tape loading means includes a loading ring having an annular or arced configuration with its center axis inclined towards the cassette, which encircles the drums, and that a capstan motor for running the magnetic tape is located under the loading ring and disposed in a space formed between the loading ring and the main chassis.

The first entrance-side tape position regulation guide and the first exit-side tape position regulation guide are cylindrical or tubular members which belong to the tape loading member assembly, which are positioned at the tape winding section and the tape unwinding section, respectively. The guides keep the magnetic tape wound around the drums at the desired position in height. The magnetic tape is thereby driven to travel along the outer peripheries of the rotary and the stationary drums with maintaining the correct attitude, thereby enabling the magnetic heads to correctly scan the tape surface.

The loading ring in the tape loading means drives, when rotated, at least the first entrance-side tape position regulation guide connected thereto and the first exit-side tape position regulation guide adjacent to the loading ring and in engagement with the same so as to load the magnetic tape engaged with these guides on the peripheries of the rotary and the stationary drums or releasing the magnetic tape from the loaded state, that is, unloading the tape. Since the loading ring is so disposed that the center axis thereof is inclined towards the loaded cassette at an inclination angle, the inclination angle may be set to a desired minimum value. The rotary and the stationary drums are disposed aloft above the central reference plane to cooperate with a rising entrance-side travel path and a falling exit-side travel path. In consequence, the center axis of the rotary and the stationary drums becomes generally perpendicular to the central reference surface and stands upright with a small inclination whereby attaining a desired tape winding state. That is, the position of the center of the plane of rotation of the magnetic heads and the position of the first entrance-side tape position regulation guide are lowered compared with the conventional arrangement. Specifically, the upper end of the first entrance-side tape position regulation guide is necessarily lowered below the upper end of the rotary drum. The direction of inclination of the center axis of the rotary and the stationary drums is also selected to place the regulation guide the lowest position. The lower ends of component parts including the drum driving motor directly connected to the bottom of the stationary drum are raised to a level which is lower than the central reference plane of the tape in the cassette but which is close to the same. As a result, the thickness of the mechanism is extremely reduced.

The capstan motor is located under the inclined loading ring and is accommodated in a space formed between the loading ring and the main chassis, thereby preventing the capstan motor projecting below the main chassis and enabling a further reduction in the overall thickness.

BRIEF DESCRIPTION OF THE DRAWINGS

FIG. 4 is a graph of the heights of the upper end of a drum and a first entrance-side tape height regulation guide with respect to a direction of inclination of the drum;

FIG. 5 is a graph of the heights of the upper end of the drum and the first entrance-side tape height regulation guide with respect to an inclination angle of the drum; and FIG. 6 is a side view of the apparatus of FIG. 1 seen from the tape exit side.

DESCRIPTION OF THE PREFERRED EMBODIMENT

An embodiment of the present invention will be described below with reference to the accompanying drawings.

Figure 1:
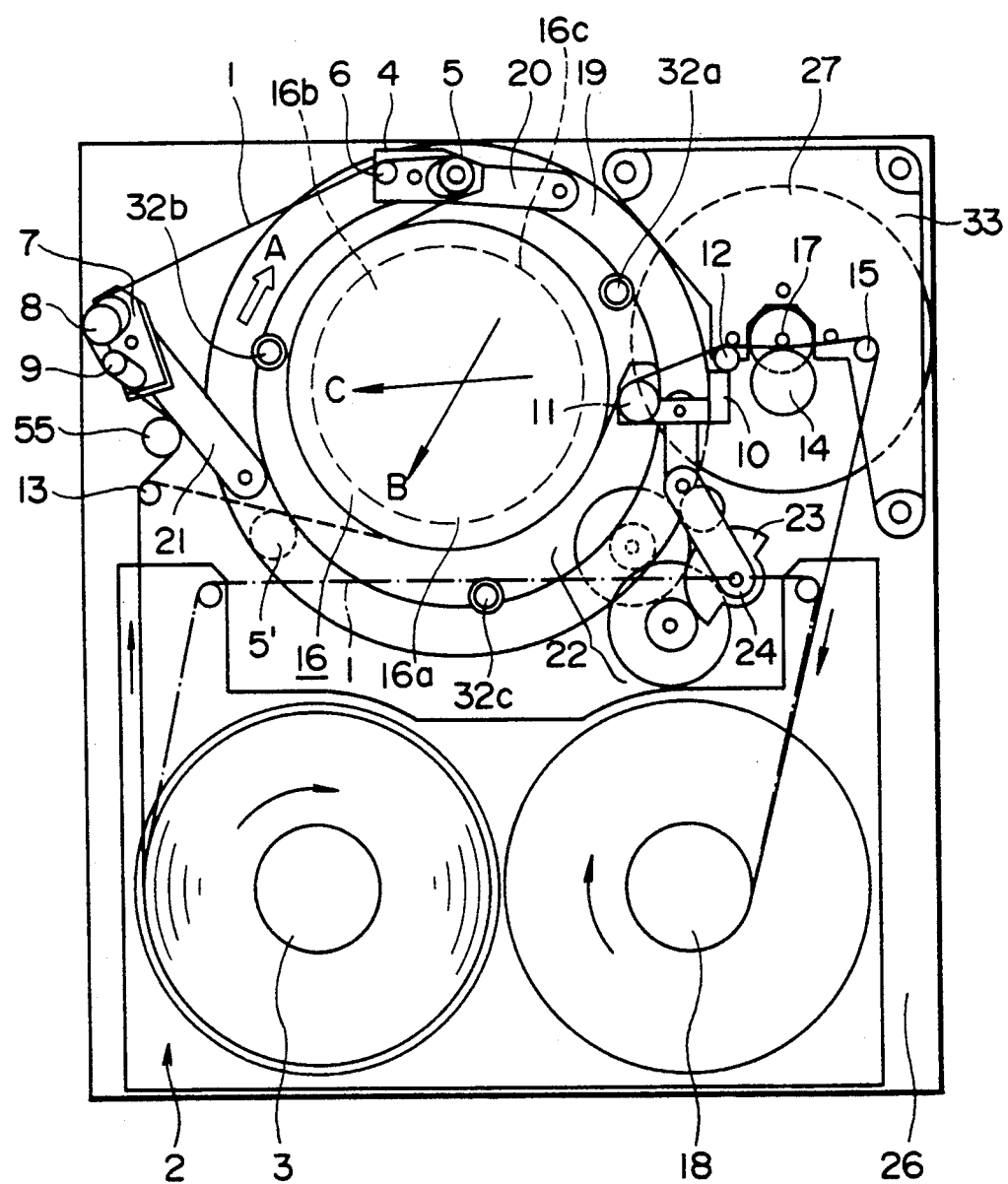
FIG. 1 is a plan view of a magnetic recording/reproducing apparatus according to one embodiment of the present invention.

FIG. 1 shows the embodiment of the present invention applied to a VTR. A main chassis 26 is provided as a base for supporting the apparatus. On the main chassis 26 disposed are: a cassette 2 including a supply reel 3 for supplying a magnetic tape 1 and a take-up reel 18 for winding up the magnetic tape 1; a rotary drum assembly 16 including a rotary drum 16a, a stationary drum 16b and a drum driving motor 16c disposed coaxially with each other; a tension pin 13; a second entrance-side slant pin 9; a second entrance-side tape height regulation guide 8; a first entrance-side slant pin 6; a first entrance-side tape height regulation guide 5 provided as a tape loading member for drawing the magnetic tape 1 from the supply reel 3 out of the cassette 2 and winding it around a periphery of the rotary drum assembly 16; a first exit-side tape height regulation guide 11; an exit-side slant pin 12; a capstan 17 provided as a member for driving and travelling the magnetic tape 1 at a constant speed; a pinch roller 14; a second exit-side tape height regulation guide 15; and an annular loading ring 19. The first entrance-side tape height regulation guide 5 and the first entrance-side slant pin 6 are mounted on a guide base 4 which is connected onto the loading ring 19 through a connection arm 20 and a spring member. The second entrance-side tape height regulation guide 8 and the second entrance-side slant pin 9 are mounted on a guide base 7 which is connected to the loading ring 19 through a connection arm 21. The tension pin 13 is disposed in a magnetic tape travel path on a front side of the rotary drum assembly 16 and next to the supply reel 3. Basically, the tension pin 13 has a function of maintaining a tension of the magnetic tape 1 constant after the magnetic tape 1 has been drawn out and set in a predetermined position, that is, after the loading operation has been completed. The tension pin 13 also has a function of drawing the magnetic tape 1 out of the cassette 2 while maintaining a level of the magnetic tape 1. The first exit-side tape height regulation guide 11 and the second exit side tape height regulation guide 15 are separate from the loading ring 19. However, they are both disposed in the vicinity of the loading ring 19 and are engaged with the loading ring 19 through a power transmission mechanism such as a transmission gear assembly so as to operate in a linked relationship with the loading ring 19 when the loading ring 19 is rotated. The first exit-side tape height regulation guide 11 is disposed in the vicinity of an inner periphery of the loading ring 19. The rotary drum assembly 16 has a drum section constituted by the rotary drum 16a and the stationary drum 16b. Magnetic heads are fixed to outer peripheral portions of the rotary drum 16a facing the stationary drum 16b. The rotary drum 16a is driven or rotated by the drum driving motor 26c disposed below the stationary drum 16b. FIG. 1 shows a state in which the magnetic tape 1 has been drawn out of the cassette 2 and wound around the drum section of the rotary drum assembly 16, that is, the loading operation has been completed. The operations of respective portions and the order of the operations performed before this state is attained will be described below.

(1) On the side of the supply reel 3, the tension pin 13 disposed near the cassette 2 is swung by a lever pivoted on a point on the main chassis 26, which lever is driven by a mode operation cam (not shown). The tension pin 13 is thereby brought into contact with the magnetic tape 1 and is swung towards the tape entrance section of the rotary drum assembly 16 while tensioning the magnetic tape 1 and maintaining the level thereby. Thereafter, the tension pin 13 is further swung to a predetermined stop position in a direction of rotation of the loading ring 19 or a direction of the arrow A, that is, a position at which it is adjacent to a reference height regulation guide 55 while a part of the magnetic tape 1 is brought into contact with the peripheral of the drum section of the rotary drum assembly 16.

(2) On the side of the take-up reel 18, a gear train 22 which is constituted by a plurality of gears and which engages with the loading ring 19 is driven or rotated by the loading ring 19 substantially simultaneously with the operation (1), thereby rotating a connection arm 24 connected to the gear train 22. The connection arm 24 moves a guide base 10 connected to an extreme end of the arm 24 as well as the exit-side slant pin 12 and the first exit-side tape height regulation guide 11 disposed on the guide base 10 and engaged with the magnetic tape 1, so that these members are displaced along the loading ring 19 in a direction opposite to the direction of rotation of the loading ring 19 (opposite to the direction A). The pinch roller 14 and the second exit-side tape height regulation guide 15 are also driven by the mode operation cam substantially simultaneously with that movement of the first exit-side tape height regulation guide 11 and then they reach predetermined positions. At this time, the pinch roller 14 and the second exit-side tape height regulation guide 15 respectively move to draw the magnetic tape 1 out of the cassette 2 because they are also engaged with the magnetic tape 1 like the first exit-side tape height regulation guide 11 and the exit-side slant pin 12 do. The pinch roller 14 is pressed against the capstan 17 with interposing the magnetic tape 1 therebetween. The exit-side slant pin 12 is disposed in front of and close to the capstan 17 and adapted to correct the magnetic tape travelling direction, the level of the magnetic tape and/or the torsion thereof on the basis of the central reference plane. A capstan motor 27 for driving the capstan 17 is coaxially disposed below the capstan 17 and directly connected to the same. The capstan 17 and the capstan motor 27 are positioned so that the magnetic tape 1 is wound around the exit-side slant pin 12 with a minimum winding angle required to travel normally and at low friction against the exit-side slant pin 12. That is, the capstan 17 or the capstan motor 27 is positioned in such a manner that an axis of rotation thereof is located on a straight line which is parallel to a tangent touching a periphery of the slant pin 12 at a point bisecting the tape winding arced portion of the periphery of the slant pin 12, and which passes through a point located nearer to the cassette 2 than the slant pin 12. The direction of this line parallel to the tangent generally corresponds to the direction of inclination of the rotary drum assembly 16.

The capstan motor 27 is a brushless motor having a rotor formed of a flat magnet. Because the moment of inertia of this rotor is sufficiently large, the rotor also serves as a flywheel.

(3) After the operation (1), the loading ring 19 is successively rotated in the direction of the arrow A on the side of the supply reel 3. As the loading ring 29 rotates, since the first entrance-side tape height regulation guide 5, the first entrance-side slant pin 6, the second entrance-side tape height regulation guide 8 and the second entrance-side slant pin 9 are connected to the loading ring 19, they are also moved along or on the path of rotation of the loading ring 19. The first entrance-side tape height regulation guide 5 is at first brought into contact with the magnetic tape 1 at a point 5' on the loading ring rotation path shown in FIG. 1 and thereafter moved on such path while being in engagement with the magnetic tape 1 together with the first entrance-side slant pin 6. The loading ring 29 is inclined in a direction of a straight line which connects the point 5' and a point at which the loading is completed. That is, the first entrance-side tape height regulation guide 5 moves along a rising path which rises at an inclination angle of the loading ring 19 so as to wind the magnetic tape 1 around the periphery of the drum section. It is possible to minimize the inclination angle of the loading ring 19 since the loading ring 19 is inclined in the above-mentioned direction. This is one of important requirements for reduction in the thickness of the mechanism.

At the same time, as the loading ring 19 is rotated and displaced, the connection arm 21 is pivoted on a point on the loading ring 19 and swung radial outwards by a certain angle. The second entrance-side tape height regulation guide 8 and the second entrance-side slant pin 9 connected to the other end of the connection arm 21 are successively displaced radial outwards in the radial direction of the rotary drum assembly 16 after they have been positioned beyond the guide 55 fixed on the main chassis 26. Therefore the magnetic tape 1 is stretched radial outwards so as to increase the entrance-side travel path. In the case of the apparatus in accordance with the present invention, the increase of the entrance-side travel path of the magnetic tape 1 is essential for the following reason. That is, in accordance with the present invention, the center of the plane of rotation of the magnetic heads in the rotary drum assembly 16 is much higher than the level at which the cassette 2 is placed. It is therefore necessary for the magnetic tape 1 to largely change the travel direction thereof as well as the position of the same while the magnetic tape 1 enters the rotary drum assembly 16 from the cassette 2. If the length of the travel path of the magnetic tape 1 is increased, the travel direction and the position thereof can be largely changed smoothly. In the magnetic tape travel path of this embodiment constituted by the connection arm 21, the guide base 27, the second entrance-side tape height regulation guide 8 and the second entrance-side slant pin 9, the length of the travel path is sufficiently large while the area occupied is restricted, thereby enabling the direction of traveling and the position of the magnetic tape 1 to be changed smoothly.

(4) The operation (2) and the operations (1) and (3) are started, progressed and completed substantially simultaneously. When these operations have been completed, the first entrance-side tape height regulation guide 5 and the first exit-side tape height regulation guide 112 reach stop positions at which the magnetic tape 1 is wound around the rotary drum assembly 16 through the predetermined winding angle. The position at which the first entrance-side tape height regulation guide 5 stops is located on the locus of rotation of the loading ring 19, and the position at which the first exit-side tape height regulation guide 11 stops is located within the circle of the loading ring 19. The loading ring 19 can rotate smoothly because it is supported at its inner periphery by retainer rollers 32a, 32b, and 32c. They are rotatably born on a cylinder base (not shown) serving as a base on which the rotary drum assembly 16 is mounted. At an initial stage of the above-described loading operation, prior to the operation of the entrance-side guide bases 4 and 7, the tension pin 13 is at first swung by the lever supported at the stationary supporting point while drawing the magnetic tape 1 out of the cassette 2 until it reaches the position at which it is adjacent to the reference height regulation guide 55. At this initial stage of the loading process, the magnetic tape 1 is wound around the reference height regulation guide 55 to maintain the magnetic tape 1 at a desired level, thereby preventing the magnetic tape 1 from being damaged by being brought into contact at its edge surface at an outlet portion of the cassette 2. Unless the magnetic tape 1 is maintained at the desired level at an early stage of the loading process as described above, the possibility of occurrence of such an undesirable contact of the edge surface of the magnetic tape 1 is high. The reference height regulation guide 55 is fixed on the main chassis 26. By the above-described loading operation, the magnetic tape 1 is set in the loaded state as shown in FIG. 1, and the apparatus is thereby made ready to start recording or reproducing of signals. That is, as the capstan 17 is rotated by the capstan motor 27, the magnetic tape 1 is driven by the capstan 17 and the pinch roller 14 so as to travel at a constant speed while being obliquely wound around the outer periphery of the rotary drum assembly 16 and then wound up around the take-up reel 18 in the cassette 2. The magnetic heads fixed to the rotary drum 16a diagonally scan or helically scan the surface of the magnetic tape 1 at the portion thereof obliquely wound around the rotary drum assembly 16, thereby recording or reproducing signals.

To put the magnetic tape 1 back in the cassette 2 after signal recording or reproducing has been completed, an unloading operation is performed, namely the operation reverse to the loading operation constituted by the operations (1) to (4) of the tape loading members. Inside the cassette 2, the magnetic tape 1 is fully wound around the reels 3 or 18.

Figure 2:
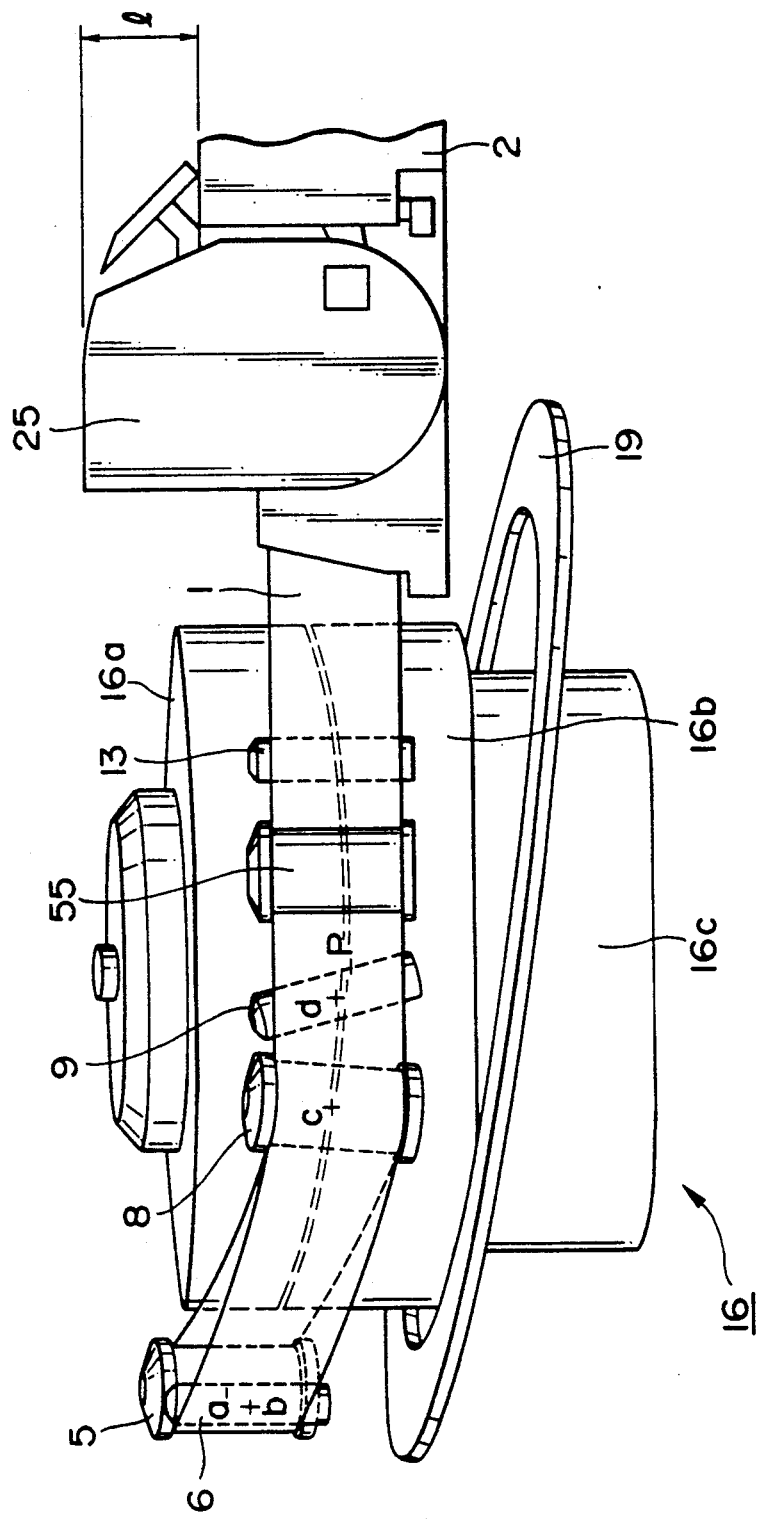
FIG. 2 is a side view of the apparatus of FIG. 1 seen from the tape entrance side.
Figure 3:
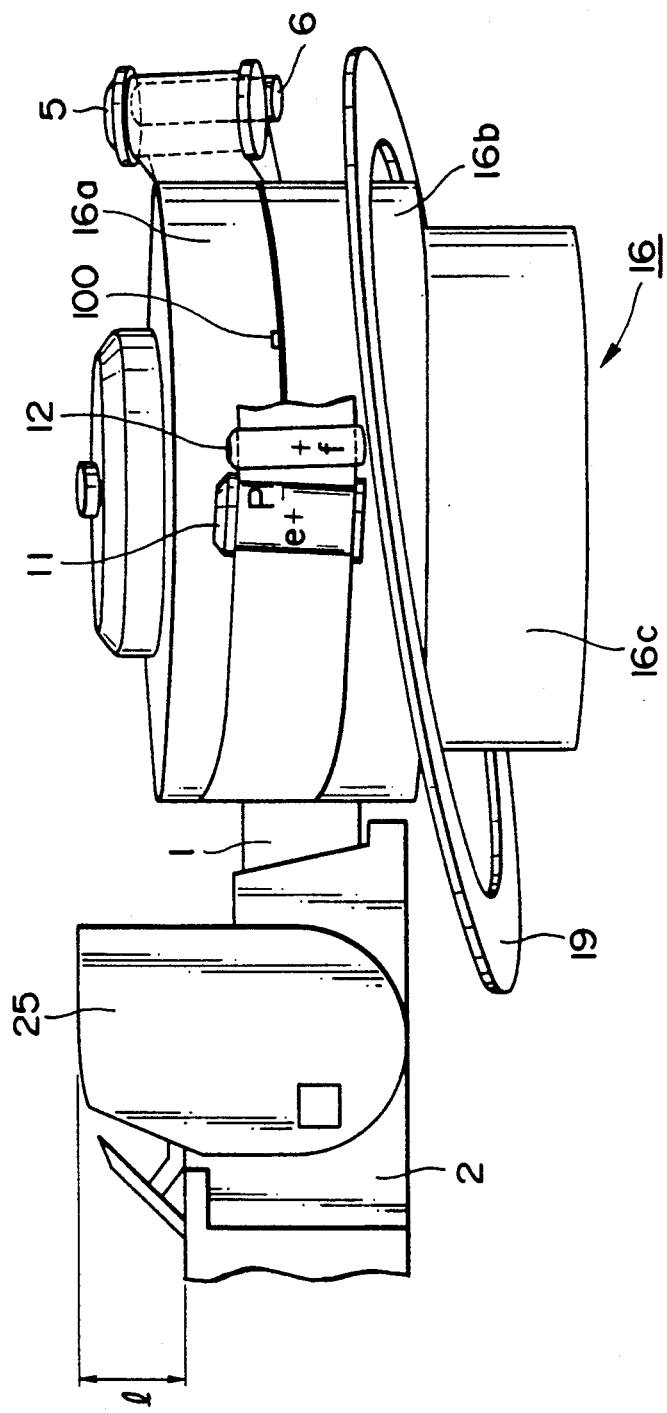
FIG. 3 is a side view of the apparatus of FIG. 1 seen from the tape exit side.

The mutual relationship among the levels of the guide members, the rotary drum assembly 16 and the cassette 2 will be seen in FIGS. 2 and 3.

As shown in tape winding centers a to d in the entrance side of the level regulation guides 5 and 8, and of the slant pins 6 and 9 are set to higher levels than the center P of the plane of rotation of the magnetic heads 100 in the rotary drum 16a. That is, the entrance-side tape travel path is formed as a rising tape path which gradually rises from the cassette 2.

As shown in FIG. 3, at the exit side, the winding centers e and f of the first exit-side tape height regulation guide 11 and of the exit-side slant pin 12 are set to lower levels than the center P of the plane of rotation of the magnetic heads 100 in the rotary drum 16a. That is, the exit-side tape travel path is formed as a descent tape path. The tape winding centers of the guides disposed between the exit-side slant pin 12 and the take-up reel 18 in the cassette 2 are set to the levels equal to the level of the central reference plane.

Thus, the tape travel path includes the rising path on the entrance side and the descent path on the exit side, and then the rotary drum assembly 16 can stand generally upright. Therefore, it is possible to avoid any increase in the thickness of the tape running system due to the inclined disposition of the rotary drum. That is, the rotary drum assembly 16 is placed sufficiently higher than the cassette 2 by means of the tape travel path constituted by the entrance-side rising path and the exit-side descent path, and it is positioned so that its center axis is set generally orthogonal to the central reference plane with a slight inclination when the desired tape winding state is attained. In this arrangement, the levels of the lower ends of the stationary drum 16b and the rotary drum 16a are high, but the central axes thereof are generally upright and then the inclination of the path through which the magnetic tape 1 travels is small or gentle. Therefore the position P of the center of the plane of rotation of the magnetic heads 100 and the position of the first entrance-side tape height regulation guide 5 in the vertical direction are remarkably lowered compared with the arrangement in accordance with the conventional art. In particular, the upper end of the first entrance-side tape height regulation guide 5 is positively lowered relative to the upper end of the rotary drum 16a. The direction of inclination of the center axis of the rotary drum assembly 16 is selected in such a manner that the level of the upper end of the rotary drum 16a coincides with that of the upper end of a front lid 25 of the cassette 2 while the inclination of the center axis is minimum. Also, the level of the lower end of the driving motor 16c directly connected to a lower portion of the stationary drum 16b is located under the central reference plane and closer to this reference plane. The above-described construction enables a remarkable reduction in the thickness of the mechanism.

In order to effectively utilize a space 1 formed when the front lid 25 of the cassette 2 opens as shown in FIGS. 2 and 3 to reduce the thickness of the mechanism, the rotary drum assembly 16 is disposed at a higher level and then the level of the center of the drum is set to a level sufficiently higher than a reference plane corresponding to a widthwise center of the tape in the cassette 2. If the rotary drum assembly 16 is so disposed that the upper end thereof corresponds to the upper end of the front lid 25 of the cassette 2, the space 1 can be utilized effectively, thereby attaining a remarkable reduction in the thickness of the mechanism. In this structure, as shown in FIG. 2, there is a need for a long tape span for acceptance of the tape level difference on the tape entrance side where the tape level extremely varies relative to the level of the central reference plane. The acceptance of the tape level difference on the tape exit side is restricted because, as shown in FIG. 3, the planar arrangement of the positions of the capstan 17 and the capstan motor 27 is considerably restricted on the basis of the shape of the main chassis 26 and no sufficient long tape span can be obtained.

The procedure of setting of the direction and the inclination angle of the rotary drum assembly 16, which is a main process of the tape running path design, will be described below.

FIG. 4 shows the relationship between the direction of inclination of the rotary drum assembly 16 and the levels of the upper ends of the rotary drum assembly 16 and the first entrance-side level regulation guide 5. The abscissa represents the direction of inclination while the ordinate represents the levels of the upper ends of the rotary drum assembly 16 and the first entrance-side level regulation guide 5. The direction of inclination is measured on the basis of an angular center of a portion of the magnetic tape 1 wound around the rotary drum assembly 16 as a reference. These levels are in relative to the level of the center of the magnetic tape 1 in the cassette 2. In the drawings, a parameter is the value of the inclination angle of the rotary drum assembly 16 relative to a perpendicular to the surface on which the cassette 2 is placed. A reference numeral 28 indicates the level or height of the upper end of the rotary drum assembly 16 and a reference numeral 29 indicates the level or height of the upper end of the first entrance-side level regulation guide 5.

There is a following relationship among the height $h_D$ of the upper end of the rotary drum assembly 16, the height $h_P$ of the center of the plane of rotation of the magnetic heads 100, the height $h_a$ of the center point a of the magnetic tape wound around the first entrance-side tape height regulation guide 5 and the height $h_g$ of the upper end of the guide 5.

$$h_D > h_g > h_a > h_P$$

Therefore the correlation between the heights of the centers of the rotary drum assembly 16 and the first entrance-side tape height regulation guide 5 and the correlation between the heights of the upper ends of these members reverse to each other at the rotary drum assembly 16 side and at the guide 5 side. That is, the upper end of the rotary drum assembly 16 is placed at the highest level in the structure of the tape running mechanism. As mentioned above, such upper end of the rotary drum assembly 16 coincides with the upper end of the front lid 25 of the cassette 2 when the lid 25 is open.

This embodiment is designed for application to a small and light VTR such as an 8 mm-tape VTR. To reduce the overall size of the tape loading mechanism as well as the tape running load, the following conditions are set for the tape running path design in accordance with the present invention:

i) on the side of the rotary drum assembly 16 where the magnetic tape 1 is taken up from the drum, the exit-side slant pin 12 is constituted by a singular slant pin and functions to correct the direction of the magnetic tape 1 in which it travels, the level thereof or the torsion of the magnetic tape 1 while winding the magnetic tape 1 angularly around the periphery of the slant pin 12 through an angle of about 20°; and ii) the capstan is disposed close to the exit-side slant pin 12 on the downstream side thereof and stands upright.

As shown in FIG. 4, the greater the inclination angle of the center axis of the rotary drum assembly 16 becomes, the lower the height 28 of the upper end of the assembly 16 becomes. Also, the height 28 changes are represented by characteristic curves having minimum values with respect to the direction of inclination of the rotary drum assembly 16. It is seen from those characteristic curves that a direction angularly deflected by an angle α from the center (hereinunder referred as "winding center") of a portion of the magnetic tape 1 wound around the rotary drum assembly 16 is the direction of inclination of the rotary drum assembly 16 by which the rotary drum assembly 16 stands uppermost upright and the height 28 of the upper end of the rotary drum assembly 16 coincides with the level of the upper end of the opened front lid 25. Also, as shown in FIG. 4, the upper end of the first entrance-side tape height regulation guide 5 which is the highest one of the magnetic tape guides is always located higher than the upper end of the rotary drum assembly 16. Thus determined is the direction of inclination of the rotary drum assembly 16 relative to the winding center, which is most suitable in terms of reduction in the thickness of the mechanism.

FIG. 5 shows the optimum value of the inclination angle of the center axis of the rotary drum assembly 16. Particularly, FIG. 5 shows the correlation between the inclination angle of the center axis of the rotary drum assembly 16 and the heights 30 and 31 of the upper end of the rotary drum assembly 16 and the upper end of the first entrance-side tape height regulation guide 5 on the condition that the direction of inclination of the center axis of the rotary drum assembly 16 is fixed at the above-mentioned optimum angle α. As can be understood from this characteristic diagram, the height 30 of the upper end of the rotary drum assembly 16 coincides with the height of the upper end of the front lid 25 of the cassette 2 when the center axis of the rotary drum assembly is inclined at an angle β from the vertical direction. The angle β has a sufficiently small value and is smaller than the lead angle of guidance of the magnetic tape. Ordinarily, the angle β is 2° to 3°.

From the characteristics shown in FIGS. 4 and 5, it is found that the thickness of the mechanism for running the magnetic tape 1 is minimized when the rotary drum assembly 16 is inclined at the angle β from the vertical direction in the direction at the angle α from the winding center.

In FIG. 6 shown is a level relationship between the cassette 2 and the magnetic tape running mechanism. The main chassis 26 is disposed at the lowermost end of the mechanism assembly in consideration of the facility of the assembling of the component parts. An electronic circuit board is mounted on the main chassis 26. In this arrangement, it is possible to attain a sufficient reduction in the thickness of the mechanism by disposing the capstan motor 27 on the upper side of the main chassis, that is, on the same side where the tape running mechanism is disposed. The capstan motor 27 is disposed in a space formed between the main chassis 26 and the loading ring 29 inclined relative to the central reference plane. This structure makes it possible to eliminate the problem that the lower end of the capstan motor 27 downwardly projects beyond the main chassis 26 to increase the overall thickness of the mechanism. The capstan motor 27 is fixed on the main chassis 26 by a capstan retaining member 33. For reduction in the thickness of the mechanism, it is preferable to reduce the inclination angle of the loading ring 29 as small as possible within a range in which the above space can accommodate the capstan motor having predetermined dimensions. The optimum direction of inclination of the loading ring 19 is a direction along which it is disposed to minimize the inclination angle. This optimum direction of inclination is generally directed towards the loaded cassette 2. In more detail, as described before, this direction of inclination is parallel to the straight line which connects two points corresponding to the position 5' at which the regulation guide 5 first contacts the magnetic tape 1 during the loading operation and the position at which the regulation guide 5 stops to complete loading operation. This direction of inclination is also inclined towards the position 5'. The inclination angle of the loading ring 19 is set to an angle $\theta$ on the basis of the surface on which the cassette 2 is placed. The angle $\theta$ is determined depending upon the thickness and the diameter of the accommodated capstan motor. Ordinarily an 8 mm-tape VTR makes use of a capstan motor having a thickness of 5 mm to 10 mm and a diameter of 30 mm to 40 mm. Accordingly, the angle $\theta$ is set to about 10°.

As explained above, in the basic construction of this embodiment, the rotary drum assembly 16 is so disposed substantially upright that the upper end of the rotary drum 16a thereof is disposed higher than the top end of the first entrance-side tape height regulation guide 5 and higher than any other tape loading members including the guides and the slant pins, and is disposed at the same level, of the upper end of the opened front lid 25 of the cassette 2. In this embodiment, therefore, it is possible to reduce the overall thickness and the weight of the apparatus while effectively utilizing even the dead space formed in direction of the height of the front lid 25 of the cassette when the same is opened.

Since the capstan motor 27 is accommodated in the space formed between the main chassis 26 and the loading ring 29 inclined towards the cassette 2, the motor 27 can be accommodated without any part projected from the main chassis 26, thereby attaining a further reduction in the thickness of the mechanism. In addition, in the structure of the present invention, there is no need for the formation of any cutout portions in the electronic circuit board to be mounted on the main chassis 26, thereby enabling an increase in the circuit area of the circuit board as well as simplification of the structure. The thickness of the production and the cost for the mechanism are thereby further reduced. The facility of the assembling of the apparatus is also improved remarkably because the capstan motor 27 is disposed above the main chassis 26.

The present invention enables, in a simple manner, a reduction in the thickness of the mechanism section of a magnetic recording/reproducing apparatus such as a VTR, a simplification of the construction, reductions in the overall size and the weight of the apparatus and improvements in the facility of assembly, thus realizing a smaller magnetic recording/reproducing apparatus which is reduced in the overall thickness and the weight and which has properties suitable for mass production.

The present invention can be carried out in other various ways without departing from its spirit or main features, and the above-described embodiment is intended in every respect to illustrate the present invention and is not to be construed as limitative. The scope of the present invention is set forth in the appended claims, and it is to be understood that and all changes and modifications which are equivalent to features set forth in the appended claims fall in the scope of the present invention.

What is claimed is:

1. A magnetic recording/reproducing apparatus of a helical scanning type including a magnetic head assembly for recording on and reproducing signals from a magnetic tape, said apparatus comprising:

a) a plurality of magnetic heads constituting said magnetic head assembly;

b) a rotary drum having said magnetic head assembly mounted on a peripheral edge portion thereof, said rotary drum adapted to be rotated by rotary driving means to slide on the surface of said magnetic tape so that said magnetic head assembly scans said magnetic tape in the helical scanning manner and has a plane of rotation;

c) a stationary drum disposed coaxially with and adjacent said rotary drum, said stationary drum guiding and maintaining said magnetic tape in a predetermined posture, which magnetic tape is wound around a periphery of said stationary drum;

d) a cassette incorporating therein tape winding means around which said magnetic tape is wound to be accommodated in said cassette, said cassette being disposed so that a central reference plane thereof extends perpendicular to the surface of said magnetic tape accommodated in said cassette and through a center of said magnetic tape in the widthwise direction thereof, and a level of the central reference plane is lower than a level of a center of the plane of rotation of said magnetic head assembly;

e) tape loading means disposed on outer peripheries of said rotary drum and said stationary drum and adapted to draw said magnetic tape out of said cassette, and obliquely winding up said magnetic tape around said outer peripheries of said rotary drum and said stationary drum through a predetermined winding angle or releasing said magnetic tape therefrom, said tape loading means including i) a first entrance-side tape height regulation guide disposed in the vicinity of the outer peripheries of said rotary drum and said stationary drum on an entrance side where said magnetic tape is supplied to said rotary drum and said stationary drum while said magnetic tape is wound around the outer peripheries of said rotary drum and said stationary drum, said first entrance-side tape height regulation guide having a tape winding center thereof disposed at a level with respect to said central reference plane which is higher than a level of said center of the plane of rotation of said magnetic head assembly with respect to said central reference plane, and ii) a first exit-side tape height regulation guide disposed in the vicinity of the outer peripheries of said rotary drum and said stationary drum on an exit side where said magnetic tape is taken up from said rotary drum and said stationary drum while said magnetic tape is wound around the outer peripheries of said rotary drum and stationary drum, said first exit-side tape height regulation guide having a tape winding center thereof disposed at a level with respect to said central reference plane which is higher than said central reference plane and which is lower than the level of said center of the plane of rotation of said magnetic head assembly;

f) a capstan adapted to make said magnetic heads travel when rotated, a driving capstan motor being directly and coaxially connected to a lower portion of said capstan to rotate the same;

g) tape tension regulation means contacting the recording surface of said magnetic tape and stably applying a predetermined tension to said magnetic tape while said magnetic tape travels; and h) a main chassis serving as a base on which said stationary drum, said cassette, said tape loading means, said capstan, said capstan motor and said tape tension regulation means are supported.

2. A magnetic recording/reproducing apparatus according to claim 1, wherein an uppermost one of an upper end of said rotary drum and an upper end of a member attached to one of said rotary drum and said stationary drum is disposed at a level substantially equal to a level of an upper end of a front lid at a front portion of said cassette through which said magnetic tape is drawn out, when said front lid is open.

3. A magnetic recording/reproducing apparatus according to claim 1, wherein said tape loading means includes a loading ring disposed to encircle said rotary drum and said stationary drum, said loading ring having an annular or an arced configuration with its axis inclined towards said cassette against said center reference plane, and at least said first entrance-side tape height regulation guide is connected to said loading ring.

4. A magnetic recording/reproducing apparatus according to claim 3, wherein said loading ring is inclined in a direction of a straight line which connects two points respectively corresponding to a point at which said first entrance-side tape height regulation guide first contacts said magnetic tape during operation of winding said magnetic tape around the outer peripheries of said rotary drum and said stationary drum and a point at which said first entrance-side tape height regulation guide stops to complete said operation of winding said magnetic tape.

5. A magnetic recording/reproducing apparatus according to claim 1, wherein said tape tension regulation means includes a tension pin disposed on an entrance side where said magnetic tape is supplied to said rotary drum and said stationary drum and close to said cassette, said tension pin cooperating with said tape loading means so as to contact at an axial portion thereof, on said entrance side, with said magnetic tape at a widthwise portion thereof, and said tension pin being operated to draw said magnetic tape out of said cassette while maintaining the level of said magnetic tape in advance of the operation of winding said magnetic tape around said rotary drum and said stationary drum by means of said first entrance-side tape height regulation guide, and said tension pin being moved to a steady position adjacent to a reference height regulation guide maintaining the level of said magnetic tape at the same level of said magnetic tape within said cassette.

6. A magnetic recording/reproducing apparatus according to claim 4, wherein said tape tension regulation means includes a tension pin disposed on an entrance side where said magnetic tape is supplied to said rotary drum and said stationary drum and close to said cassette, said tension pin cooperating with said tape loading means so as to contact at an axial portion thereof on said magnetic tape at a widthwise portion thereof, and said tension pin being operated to draw said magnetic tape out of said cassette while maintaining the level of said magnetic tape in advance of the operation of winding said magnetic tape around said rotary drum and said stationary drum by means of said first entrance-side tape height regulation guide, and said tension pin being moved to a steady position adjacent to a reference height regulation guide maintaining the level of said magnetic tape at the same level of said magnetic tape within said cassette.

7. A magnetic recording/reproducing apparatus according to claim 6, wherein said tape loading means is constructed in such a manner that, during loading operation, said first entrance-side tape height regulation guide is on a locus of rotation of said loading ring and said first entrance-side tape height regulation guide contacts said magnetic tape at a position which contacts a common tangent extending with respect to said tension pin and said rotary or stationary drum on the side of said cassette.

8. A magnetic recording/reproducing apparatus according to claim 3, wherein said capstan motor is disposed under said loading ring in an overlapping manner on the downstream side of said first exit-side tape height regulation guide, the axis of said capstan motor being located in a path through which said magnetic tape travels.

9. A magnetic recording/reproducing apparatus according to claim 8, wherein said capstan motor is disposed in a space formed between said loading ring and said main chassis.

10. A magnetic recording/reproducing apparatus according to claim 8, wherein said capstan or said capstan motor is positioned in such a manner that the axis of rotation thereof is located on a straight line which is parallel to a tangent touching a circumference of an exit-side slant pin disposed in front of and close to said capstan at a point bisecting the tape winding portion of the circumferential surface of said exit-side slant pin, and which passes through a point located nearer to said cassette than said slant pin.

11. A magnetic recording/reproducing apparatus according to claim 9, wherein said capstan or said capstan motor is positioned in such a manner that the axis of rotation thereof is located on a straight line which is parallel to a tangent touching a circumference of an exit-side slant pin disposed in front of and close to said capstan at a point bisecting the tape winding portion of the circumferential surface of said exit-side slant pin, and which passes through a point located nearer to said cassette than said slant pin.

12. A magnetic recording/reproducing apparatus according to claim 1, wherein center axes of said rotary drum and said stationary drum is inclined towards said first entrance-side tape height regulation guide by an angle of 30° to 50° from a point which bisects a circular arc along which said magnetic tape is wound on said drums, and an inclination angle of said center axes relative to a perpendicular to said center reference plane is equal to or smaller than a lead angle of said rotary drum and said stationary drum relative to said magnetic tape.

13. A magnetic recording/reproducing apparatus according to claim 3, wherein said tape loading means includes, a second entrance-side tape height regulation guide on which said magnetic tape travels, disposed in a position on a path through which said magnetic tape travels on upstream side of said first entrance-side tape height regulation guide, said second entrance-side tape height regulation guide being engaged with said loading ring by a connection arm, and a guide base adapted to be displaced radially outwards of said loading ring by the pivotal motion of said connection arm as said loading ring is rotated.

* * * * *